US012759615B2

(12) United States Patent
Harris et al.

(10) Patent No.: US 12,759,615 B2
(45) Date of Patent: Oct. 13, 2026

(54) STEER-BY-WIRE ROAD WHEEL ACTUATOR BALL SCREW ANTI-ROTATION MECHANISM

(71) Applicant: Steering Solutions IP Holding Corporation, Saginaw, MI (US)

(72) Inventors: Ryan D. Harris, Clio, MI (US); Trent E. Konwinski, Linwood, MI (US); Christopher R. Case Myers, Freeland, MI (US); Eric D. Pattok, Frankenmuth, MI (US); Travis L. Palmer, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 329 days.

(21) Appl. No.: 18/488,964

(22) Filed: Oct. 17, 2023

(65) Prior Publication Data

US 2024/0116558 A1 Apr. 11, 2024

Related U.S. Application Data

(63) Continuation-in-part of application No. 18/458,217, filed on Aug. 30, 2023.

(Continued)

(51) Int. Cl.
*B62D 5/00* (2006.01)
*B62D 5/04* (2006.01)

(52) U.S. Cl.
CPC ........... *B62D 5/001* (2013.01); *B62D 5/0424* (2013.01)

(58) Field of Classification Search
CPC ........ B62D 5/001; B62D 5/0448; B62D 5/04; B62D 5/0445; B62D 3/123; F16H 55/26; F16H 55/28; F16H 55/283; F16H 2025/204; F16H 2019/046; F16C 2326/24; F16C 29/002; F16C 29/02
See application file for complete search history.

(56) References Cited

U.S. PATENT DOCUMENTS

| | | | |
|---|---|---|---|
| 2002/0124670 | A1 | 9/2002 | Bugosh |
| 2021/0394818 | A1 | 12/2021 | Zinnecker et al. |

FOREIGN PATENT DOCUMENTS

| | | | |
|---|---|---|---|
| CN | 103010804 | A | 4/2013 |
| CN | 107031700 | A | 8/2017 |

(Continued)

OTHER PUBLICATIONS

Espace translation of DE 10 2017 103 975 A1 (Year: 2017).*

(Continued)

*Primary Examiner* — Vivek D Koppikar
*Assistant Examiner* — Scott Lawrence Strickler
(74) *Attorney, Agent, or Firm* — Dickinson Wright PLLC

(57) ABSTRACT

A steer-by-wire steering system for a vehicle includes a rack moveable in an axial direction. The steer-by-wire steering system also includes an anti-rotation device disposed proximate an outer surface of the rack. The anti-rotation device includes a yoke having a bearing journal extending therefrom. The anti-rotation device also includes a bearing disposed on the bearing journal. The anti-rotation device further includes a running surface disposed within a rack housing and extending in a longitudinal direction of the rack, wherein the bearing is positioned to move along the running surface during operation.

18 Claims, 21 Drawing Sheets

Related U.S. Application Data

(60) Provisional application No. 63/451,417, filed on Mar. 10, 2023, provisional application No. 63/429,465, filed on Dec. 1, 2022, provisional application No. 63/417,232, filed on Oct. 18, 2022, provisional application No. 63/402,325, filed on Aug. 30, 2022.

(56) References Cited

FOREIGN PATENT DOCUMENTS

| | | | | | |
|---|---|---|---|---|---|
| CN | 207389292 | U | | 5/2018 | |
| CN | 109311507 | A | | 2/2019 | |
| CN | 109969253 | A | | 7/2019 | |
| CN | 110712181 | A | | 1/2020 | |
| DE | 10344726 | B4 | * | 3/2016 | ........... F16H 55/283 |
| DE | 102017103975 | A1 | * | 8/2018 | ........... B62D 5/0448 |
| DE | 102020102212 | A1 | * | 8/2021 | ........... B62D 5/0445 |
| WO | 03011674 | A1 | | 2/2003 | |

OTHER PUBLICATIONS

Espace translation of DE 10 2020 102 212 A1 (Year: 2021).*
Espace translation of DE 10344726 B4 (Year: 2016).*
Search Report for First Office Action regarding corresponding CN App. No. 202311356389.9; dated Jun. 30, 2026.
First Office Action regarding corresponding CN App. No. 202311128465.0; dated Apr. 13, 2026.

* cited by examiner

STEER-BY-WIRE ROAD WHEEL ACTUATOR BALL SCREW ANTI-ROTATION MECHANISM

CROSS-REFERENCE TO RELATED APPLICATIONS

This application claims the benefit of priority to U.S. Provisional Patent Application Ser. No. 63/417,232, filed Oct. 18, 2022, U.S. Provisional Patent Application Ser. No. 63/429,465, filed Dec. 1, 2022, U.S. Provisional Patent Application Ser. No. 63/451,417, filed Mar. 10, 2023, and U.S. patent application Ser. No. 18/458,217, filed Aug. 30, 2023, which claims priority to U.S. Provisional Patent Application Ser. No. 63/402,325, filed Aug. 30, 2022, the disclosures of which are incorporated by reference herein in their entireties.

FIELD OF THE INVENTION

The subject matter disclosed herein relates to electric power steering (EPS) systems and, more particularly, to a road wheel actuator anti-rotation mechanism for such EPS systems electric power steering (EPS) systems.

BACKGROUND

Various electric power steering (EPS) systems have been developed for assisting an operator with vehicle steering. One type of EPS system is referred to as a rack electric power steering (REPS) system. Some examples of steer-by-wire (SbW) road wheel actuators (RWAs) are simply ball screw based rack electric power steering systems without input shafts. In this configuration, a pinion gear shaft still engages rack teeth cut into the ball screw rack bar. This gear mesh provides two primary functions. First, the pinion gear is a convenient rotating member for ball screw position sensing is provided. Second, the pinion gear serves as an anti-rotation feature to prevent spinning of the ball screw. If a steer-by-wire road wheel actuator is designed for a large vehicle, it may require the use of two ball nuts on the same ball screw to achieve the required output force. Since the center of the ball circuits in each ball nut defines the axis of the ball screw, the addition of a rack and pinion mesh to this type of system would lead to an over-constraint condition. The over-constraint is undesirable since it will lead to friction variation if parts are out of alignment.

SUMMARY OF THE DISCLOSURE

According to one aspect of the disclosure, a steer-by-wire steering system for a vehicle includes a rack moveable in an axial direction. The steer-by-wire steering system also includes an anti-rotation device disposed proximate an outer surface of the rack. The anti-rotation device includes a yoke having a bearing journal extending therefrom. The anti-rotation device also includes a bearing disposed on the bearing journal. The anti-rotation device further includes a running surface disposed within a rack housing and extending in a longitudinal direction of the rack, wherein the bearing is positioned to move along the running surface during operation.

According to another aspect of the disclosure, a steering system for a vehicle includes a rack moveable in an axial direction. The steering system also includes an anti-rotation device disposed about an outer surface of the rack. The anti-rotation device includes a yoke having a bearing journal extending therefrom. The anti-rotation device also includes a first bearing disposed on the bearing journal. The anti-rotation device further includes a second bearing disposed on the bearing journal. The anti-rotation device yet further includes a running surface in a rack housing, the running surface extending in a longitudinal direction of the rack, the running surface having a first side and a second side opposite the first side, wherein the first bearing is positioned to contact and move along the first side of the running surface and the second bearing is positioned to contact and move along the second side of the running surface during operation.

According to yet another aspect of the disclosure, a steering system for a vehicle includes a rack moveable in an axial direction. The steering system also includes an anti-rotation device disposed about an outer surface of the rack. The anti-rotation device includes a yoke having a bearing journal extending therefrom. The anti-rotation device also includes a first bearing disposed on the bearing journal. The anti-rotation device further includes a second bearing disposed on the bearing journal. The anti-rotation device yet further includes a pair of running plates comprising a first plate and a second plate at least partially disposed within a rack housing, the running plates extending in a longitudinal direction of the rack, the running plates disposed on opposing sides of the first and second bearing, wherein the first bearing is positioned to contact and move along the first plate and the second bearing is positioned to contact and move along the second plate during operation.

These and other advantages and features will become apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the embodiments described herein are used in conjunction with a steering assembly of a vehicle, such as a car, truck, sport utility vehicle, crossover, mini-van, marine craft, aircraft, all-terrain vehicle, recreational vehicle, or other suitable vehicles. As discussed herein, an electric power steering (EPS) system, including a steer-by-wire system, for example, includes an anti-rotation mechanism where a pinion is not used in the steering system. The anti-rotation mechanism resists rotation of a ball screw, lead screw, rack or the like. Such rotation is induced by the loading of the threading of one or more ball nuts or lead nuts. It is to be understood that the term "anti-rotation mechanism" may also be referred to herein as an "anti-rotation device".

As used herein, the terms screw, ball screw, and rack define a longitudinal member which is translated upon rotation of another member, such as a ball nut, for example. It is to be understood that the components may be used in various embodiments of the disclosure and are not limiting of other components which may be translated to carry out steering maneuvers.

Figure 1:
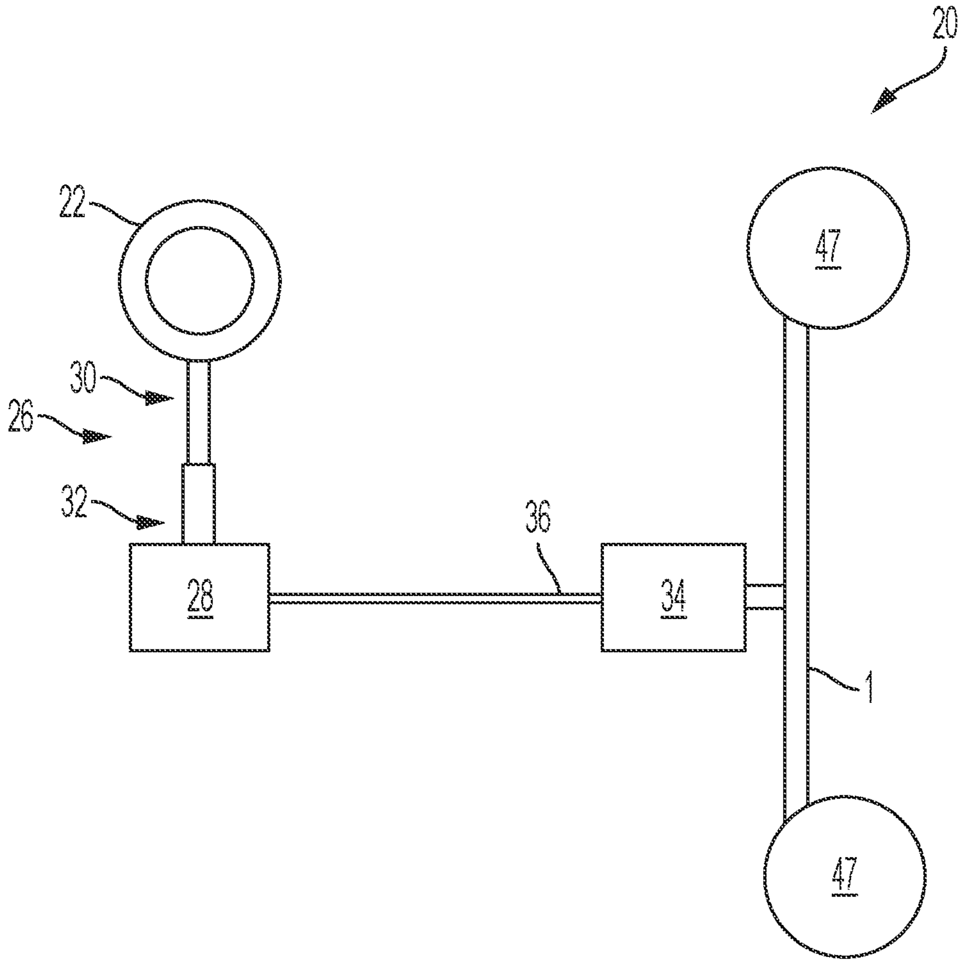
FIG. 1 illustrates a steering assembly with a rack electric power steering system.

Referring initially to FIG. 1, a power steering system 20 is generally illustrated schematically. The power steering system 20 may be configured as a driver interface steering system, an autonomous driving system, or a system that allows for both driver interface and autonomous steering. The steering system 20 may include an input device 22, such as a steering wheel, wherein a driver may mechanically provide a steering input by turning the steering wheel. A steering column 26 extends along an axis from the input device 22 to an output assembly 28. The steering column 26 may include two or more axially and/or rake adjustable parts, such as a first portion 30 and a second portion 32 which are axially adjustable with respect to one another. However, only a single portion may be present in some embodiments. The embodiments disclosed herein are utilized in steering systems where the output assembly 28 is in operative communication with an actuator 34 that is coupled to a rack, such as a ball screw rack 1, having a helical screw/linear rack configuration. The output assembly 28 is in operative communication, such as wired communication 36 (e.g., steer-by-wire configuration) with the actuator 34. Translation of the rack 1 adjusts the road wheels 47 for steering maneuvers in some embodiments.

Figure 2:
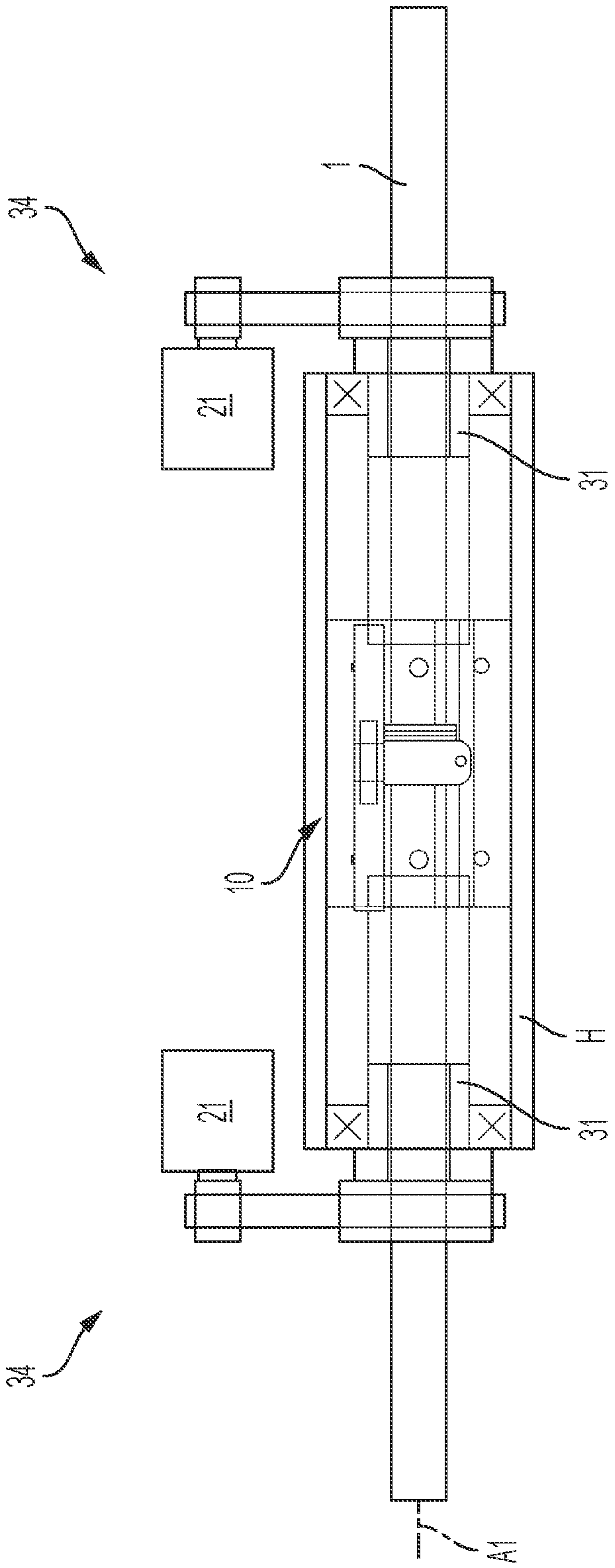
FIG. 2 schematically illustrates a dual motor embodiment of the rack electric power steering system.

As illustrated in FIG. 2, the rack 1 is translated with at least one actuator, and possibly two or more actuators 34, by way of example and without limitation. Each actuator 34 includes a motor 21 and a ball nut 31 configured to drive the rack 1 for translation along a rack axis A1. The rack 1 is at least partially surrounded radially by a housing, referenced with H. An anti-rotation mechanism 10 is disposed within a bore of the housing H and is described herein.

Figure 3:
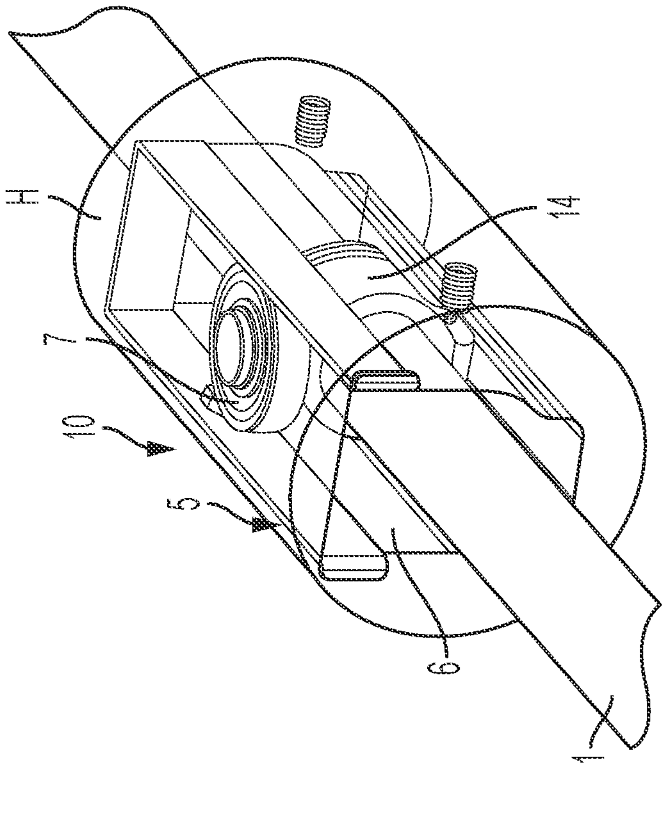
FIG. 3 is a perspective view of an anti-rotation mechanism for the rack electric power steering system disposed within a housing.

Referring now to FIG. 3, the rack 1 and the anti-rotation mechanism 10 for the rack 1 are shown disposed within the housing H. The anti-rotation mechanism 10 resists rotation of the rack 1 during operation, as disclosed herein.

Figure 4:
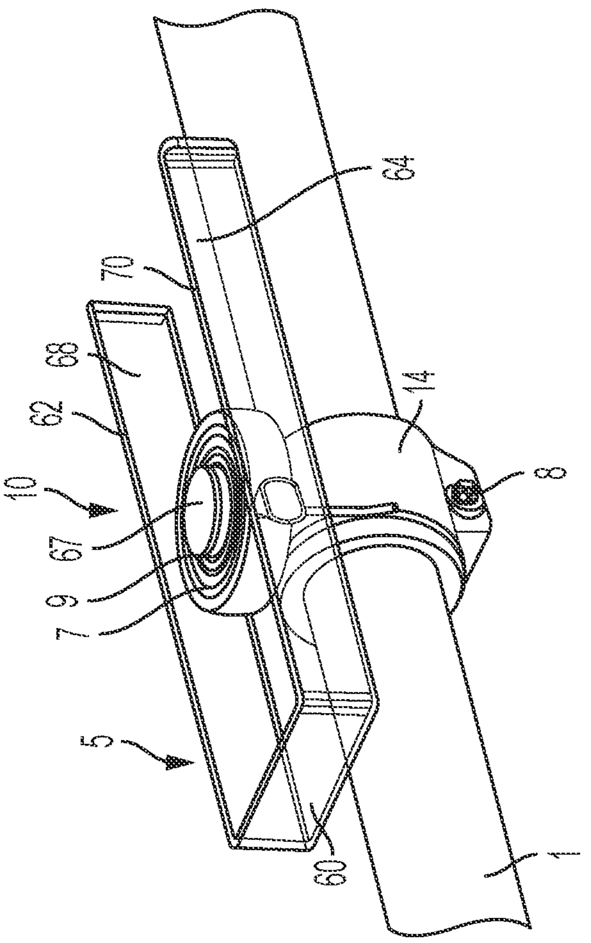
FIG. 4 is a perspective view of the anti-rotation mechanism.

The anti-rotation mechanism 10 is illustrated within a bore 6 defined by the housing H in FIG. 3 and with the housing H removed in FIG. 4 to better illustrate various aspects of the anti-rotation mechanism 10. Referring to FIGS. 3 and 4, the anti-rotation mechanism 10 includes a yoke 14 surrounding the rack 1, with a bearing 7 attached to the yoke 14. The bearing 7 is positioned between a running plate structure 5. The running plate structure 5 is disposed within the bore 6 of the housing H, and in abutment with the walls defining the bore 6.

The yoke 14 defines a yoke bore with a yoke bore surface 15. The yoke bore surface 15 is smooth in some embodiments. In other embodiments, the yoke bore surface 15 is textured, for example, with a knurl to increase the friction at an interface with the rack 1. The yoke 14 includes a break 16 to allow for enough deflection to clamp the yoke 14 on the outer surface of the rack 1, as shown more clearly in FIGS. 5 and 6. The yoke 14 is positioned along the rack 1 between the two ball nuts 31. In some embodiments, the yoke 14 is located at a central axial location of the rack 1, such as approximately at a mid-point of the rack 1 in the axial direction of the rack 1. The yoke 14 is located on the rack 1 with a pinch bolt 8—or any other suitable fastener mechanism to provide a clamp force sufficient to fittingly retain the yoke 14 to the rack 1.

Figure 8:
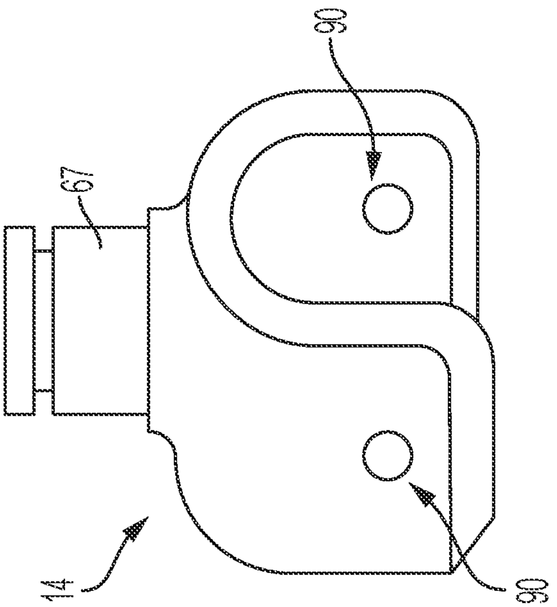
FIG. 8 is a perspective view of the yoke of the anti-rotation mechanism.
Figure 7:
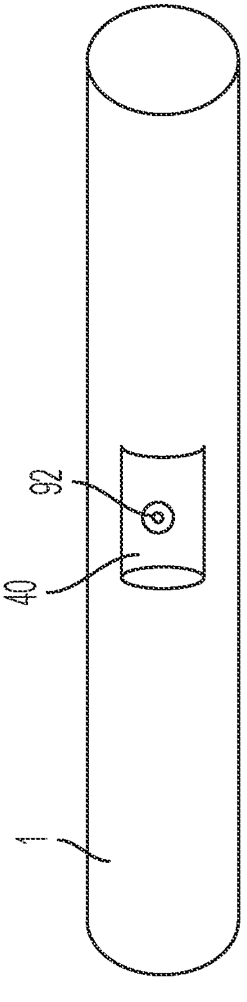
FIG. 7 is a perspective view of a ball screw having a mounting structure for a yoke of the anti-rotation mechanism.
Figure 10:
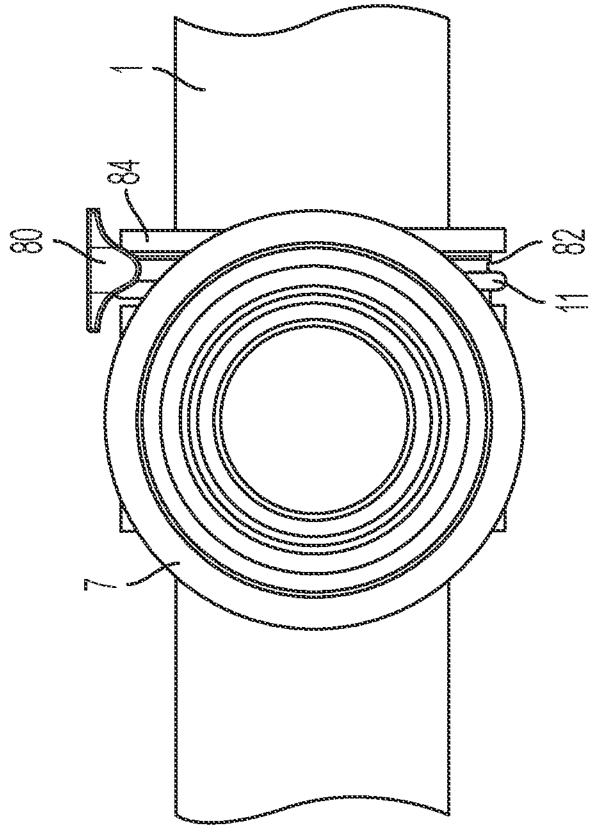
FIG. 10 is a top view of the anti-rotation mechanism.
Figure 9:
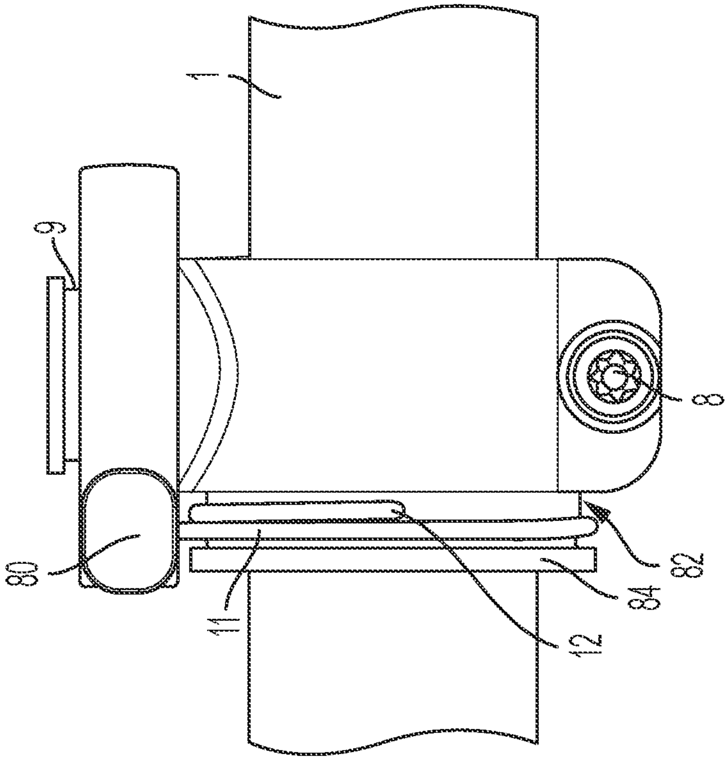
FIG. 9 is a side, elevation view of the anti-rotation mechanism.

As shown in FIGS. 7 and 8, the rack 1 may have one or more recessed regions 40 to receive the yoke 14. The recessed region(s) 40 may be any suitable geometry configured to receive the yoke 14 in a desired position. For example, machined flats may be provided on each side of the rack 1. The yoke 14 includes a pair of holes 90 which align with holes 92 defined by the rack 1 to allow the pinch bolt 8 to clamp the yoke 14 to the rack 1. The connection of the yoke 14 to the rack 1 ensures that the yoke 14 translates in the axial direction of the rack 1 with the rack 1. The connection between the yoke 14 and the rack 1 also prevents the yoke 14 from spinning relative to the rack 1.

Referring now to FIGS. 3 and 4, as described above, the running plate structure 5 is positioned in the housing bore 6. The running plate structure 5 is a single, integrally formed component as shown. In the illustrated embodiment, the running plate structure 5 is a substantially U-shaped component having an end segment 60, a first plate segment 62 and a second plate segment 64. In the illustrated embodiment, the first plate segment 62 and the second plate segment 64 are substantially parallel to each other and substantially perpendicular to the end segment 60. Each plate segment 62, 64 has an inner running plate surface, specifically a first inner running plate surface 68 for the first plate segment 62 and a second inner running plate surface 70 for the second plate segment 64. The running plate structure 5 is fixed within the housing bore 6 in any suitable manner and is in abutment with the housing H. Although shown and described as a single component formed in a substantially U-shape, it is to be understood that two separate components could be positioned relative to each other in the same manner as the first plate segment 62 and the second plate segment 64 in other embodiments.

The bearing 7, which is attached to the yoke 14, is positioned between the first plate segment 62 and the second plate segment 64. The bearing 7 is configured to react against the running plate structure 5 during operation. The bearing 7 is pressed onto a journal 67 on the yoke 14 with a retaining ring or the like (not shown) positioned next to the bearing 7 in a retaining ring groove 9. In some embodiments, the retaining ring is not needed and the press load associated with pressing the bearing 7 onto the journal 67 is sufficient to hold the bearing 7 to the yoke 14. The distance between the first inner running plate surface 68 and the second inner running plate surface 70 is slightly larger than an outer diameter of the bearing 7, such that the bearing 7 will only contact and thus roll against one side of the steel running surface at a time, i.e. one of the inner running plate surfaces 68, 70. The outer ring of the bearing 7 has a curved profile (e.g., spherical) which results in a point contact on one of the inner running plate surfaces 68. 70.

Figure 6:
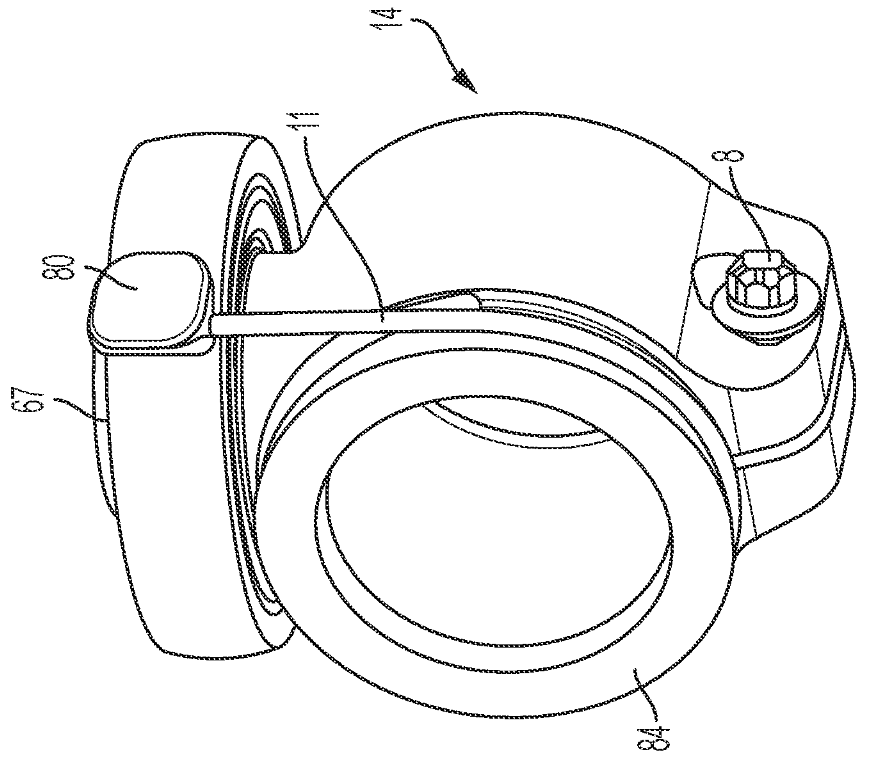
FIG. 6 is a second perspective view of a portion of the anti-rotation mechanism.
Figure 5:
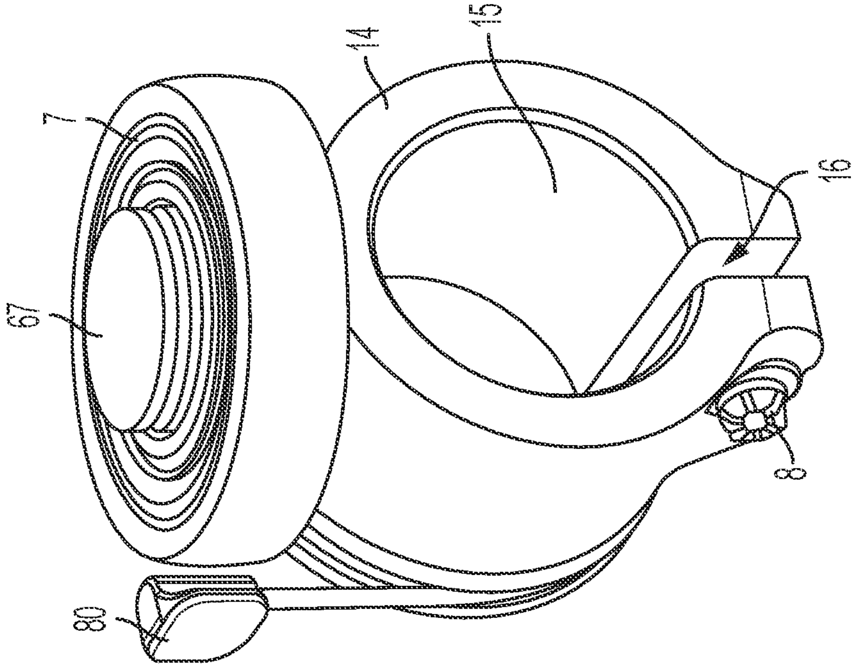
FIG. 5 is a first perspective view of a portion of the anti-rotation mechanism.

A biasing member 11, in combination with a slider 80, work to apply a torque to the yoke 14. The biasing member 11 is positioned within a groove 82 defined by an axially extending portion 84 of the yoke 14. The biasing member 11 may be any type of resilient member capable of retaining the slider 80 in a desired position, to which an end of the biasing member 11 is operatively coupled, as shown in FIGS. 5 and 6. In operation, when there is little to no torque on the rack 1 from the ball nuts 31, the torque from the biasing member 11 forces the bearing 7 to maintain contact with one side of the running plate structure 5, i.e. one of the inner running plate surfaces 68, 70. When a large torque is applied to the rack 1 by the ball nuts 31, the preload from the biasing member 11 is overcome and the bearing 7 will rotate with the yoke 14 until it makes contact with the other side of the running plate structure 5, i.e. the other of the inner running plate surfaces 68, 70. The biasing member 11 and the slider 80 are meant to prevent noise when road forces or driver inputs cause the torque on the rack 1 to reverse. The groove 82 on the yoke 14 at least partially guides the biasing member 11 and a retention hole 12 locates the end of the biasing member 11 by fixing the end therein.

The slider 80 is formed of a material having a coefficient of friction lower than the coefficient of friction of the running plate structure 5 in some embodiments. By way of non-limiting example, the slider 80 may be formed of plastic, but other materials are contemplated. This allows the slider 80, and therefore the bearing 7 and yoke 14, to move along the running plate structure 5 with little to no significant resistance.

The vertical walls of the inner running plate surfaces 68, 70 allow the yoke 14 and thus the rack 1 to float radially in the direction of the bearing 7 axis. The curved profile of the bearing 7 outer surface allows the rack 1 to shift side-to-side without generating a side load on the rack 1 due to such displacement. The disclosed embodiments allow for a reaction force between the bearing 7 and the running plate structure 5 to counteract any torque applied to the rack 1 by the ball nuts 31 while not over-constraining the position of the rack 1.

The embodiments disclosed herein provides several structural features and benefits, including, but not limited to: 1) a yoke and bearing mechanism that clamps onto the surface of the ball screw via a pinch bolt; 2) torque applied to the ball screw by the ball nuts is transferred to the yoke via friction; 3) reaction force is generated at the outer surface of the bearing against the running surface that reacts the ball screw torque; 4) biasing member with a plastic slider forces the bearing to run against one side of the running surface when the ball screw torque is low and prevents reversal noise; 5) the vertical walls of the running surface allow the ball screw to move along the axis of the bearing with no resistance; 6) the spherical profile of the bearing outer ring running on the flat running surfaces allows the ball screw to move side-to-side without generating a side load on the ball screw; and 7) mechanism prevents the over constraint of the ball screw axis.

Referring now to FIGS. 11-22, the anti-rotation mechanism 101 is shown according to another embodiment. The anti-rotation mechanism 101 includes the rack, referred to hereafter as ball screw 104, which can be housed between at least one, and shown as two actuators 149, by way of example and without limitation, with each actuator 149 including a motor 102 and a ball nut 103. A running surface 105*a* is positioned in a housing bore 106 such that an anti-rotation member, shown as a bearing 107 of the anti-rotation mechanism 101 reacts against the running surface 105*a*. The running surface 105*a* can be fabricated of any suitable material, such as steel, by way of example and without limitation. The bearing 107 can be provided as any desired type of bearing, depending on the application, including a roller bearing 107. The bearing 107 can be pressed onto a journal on a yoke 114 with a retaining ring (not shown) positioned adjacent to the bearing 107 in a retaining ring groove 109. The yoke 114 is centrally located on the ball screw 104 with a retainer, such as a clamping retainer, and shown as a pinch bolt 108 providing clamp force, by way of example and without limitation. The distance D (FIG. 13) between opposite, generally parallel running sides of the running surface 105*a* is slightly larger than an outer diameter of an outer ring (race) the bearing 107 such that the bearing 107 will only contact and roll against one side of the running surface 105*a* at a time, thereby avoiding opposed forces being applied to the bearing 107. The outer ring of the bearing 107 can be provided having a spherical profile in order to make a point contact on the running surface 105*a*. A biasing member 111, in combination with a lubricious slider, such as a lubricious plastic slider 110, by way of example and without limitation, work to apply a torque to the yoke 114. When there is little to no torque on the ball screw 104 from the ball nuts 103, the torque from the biasing member 111 will force the bearing 107 to maintain contact with one side of the running surface 105*a*. When an increased torque is applied to the ball screw 104 by the ball nuts 103, the preload from the biasing member 111 will be overcome and the bearing 107 will rotate with the yoke 114 until it makes contact with the opposite side of the running surface 105*a*.

The biasing member 111 and slider 110 are meant to prevent noise when road forces or driver inputs cause the torque on the ball screw 104 to reverse. A groove 113 can be provided on the yoke 114 to help retain the biasing member 111 and a retention hole 112 can be provided to fixedly locate and retain an end of the biasing member 111. A yoke bore 115 configured for engagement with the rack 104 can be smooth or textured, for example with a knurl, to increase the friction at the interface with ball screw 104. A split 116 in the yoke 114 allows for generation of sufficient deflection to clamp the yoke bore 115 into fixed engagement with an outer surface of the ball screw 104.

The generally U-shaped vertical walls, including the opposed, generally parallel walls forming the running surface 105*a*, allow the yoke 114, and thus the ball screw 104 to float radially along the direction of a rotational axis of the bearing 107. The spherical profile of the outer race of the bearing 107 allows the ball screw 104 to shift side-to-side without generating a side load on the ball screw 104 due to the displacement along the bearing rotational axis. This arrangement allows for a reaction force between the bearing 107 and the running surface 105*a* to counteract any torque applied to the ball screw 104 by the ball nuts 103 while not over constraining the position of the ball screw 104.

Figure 11:
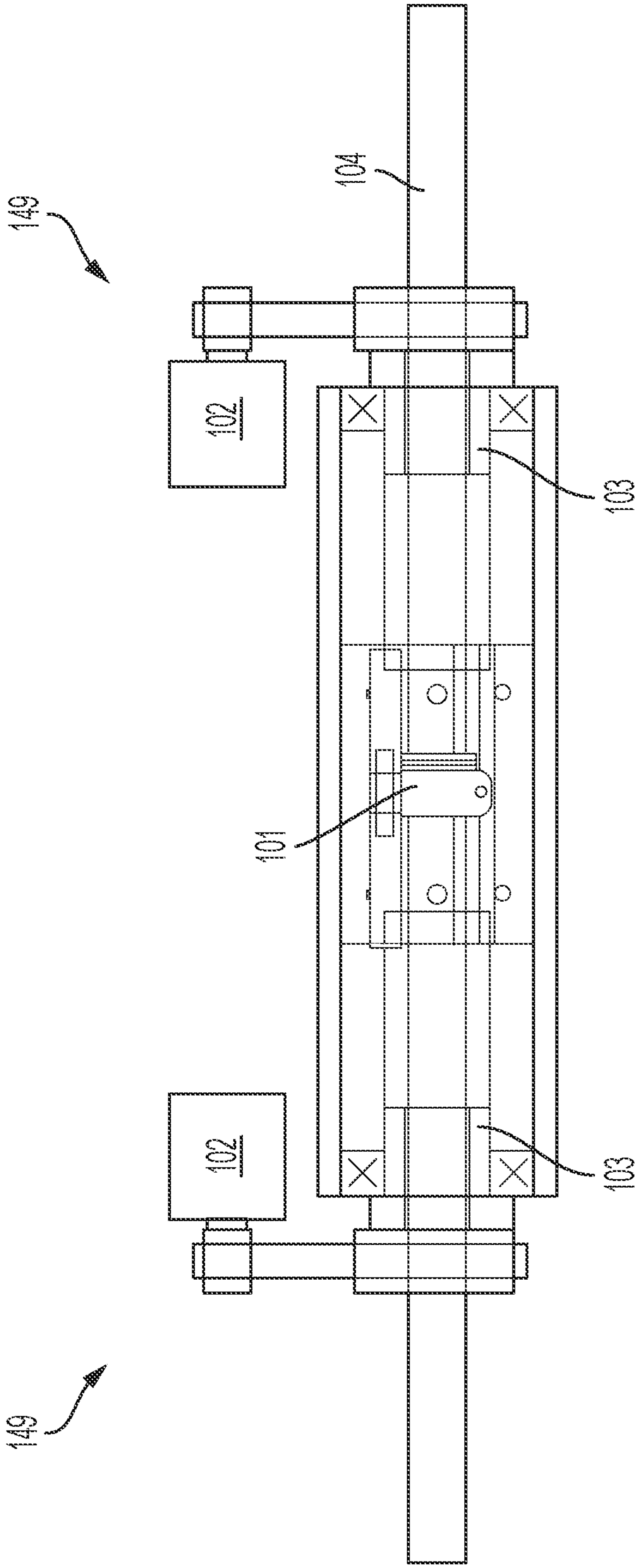
FIGS. 11-22 illustrate the anti-rotation mechanism according to another embodiment.
Figure 13:
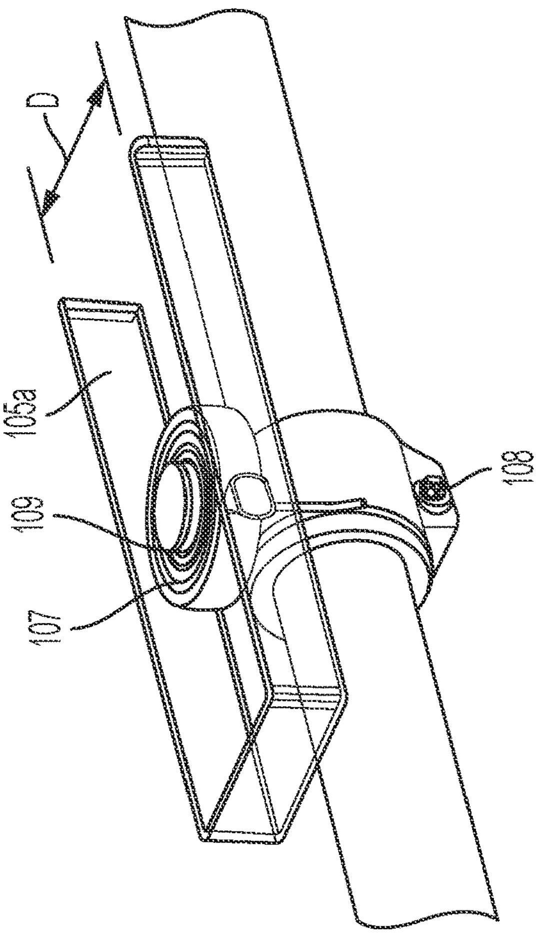
Figure 12:
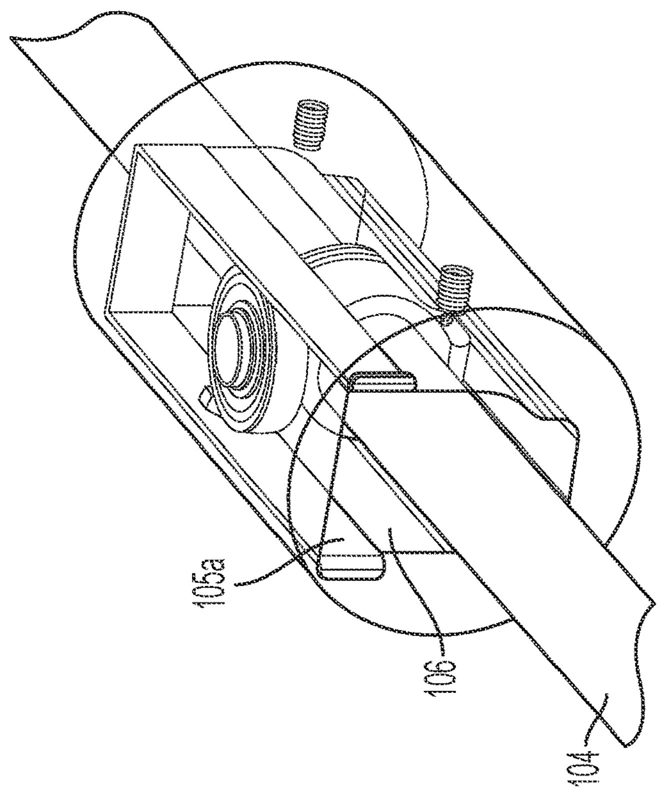
Figure 15:
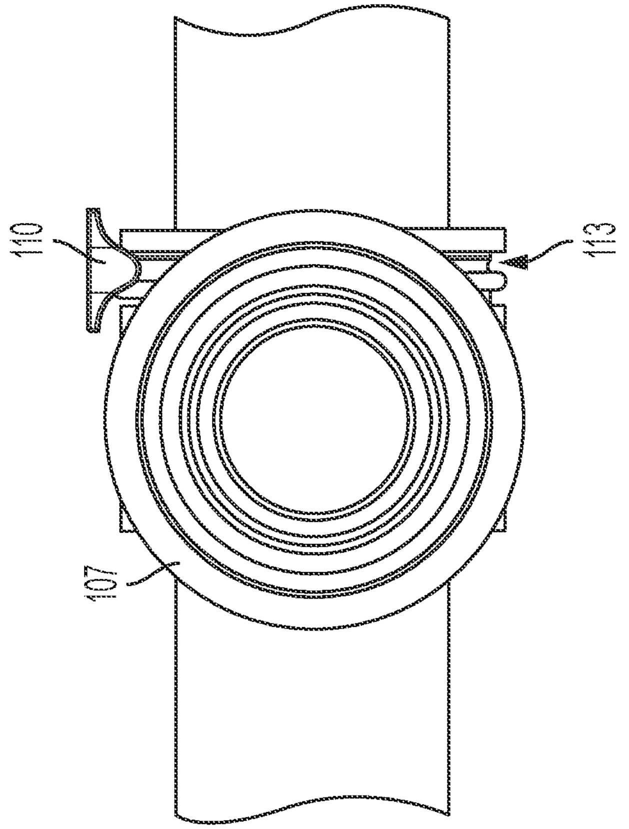
Figure 14:
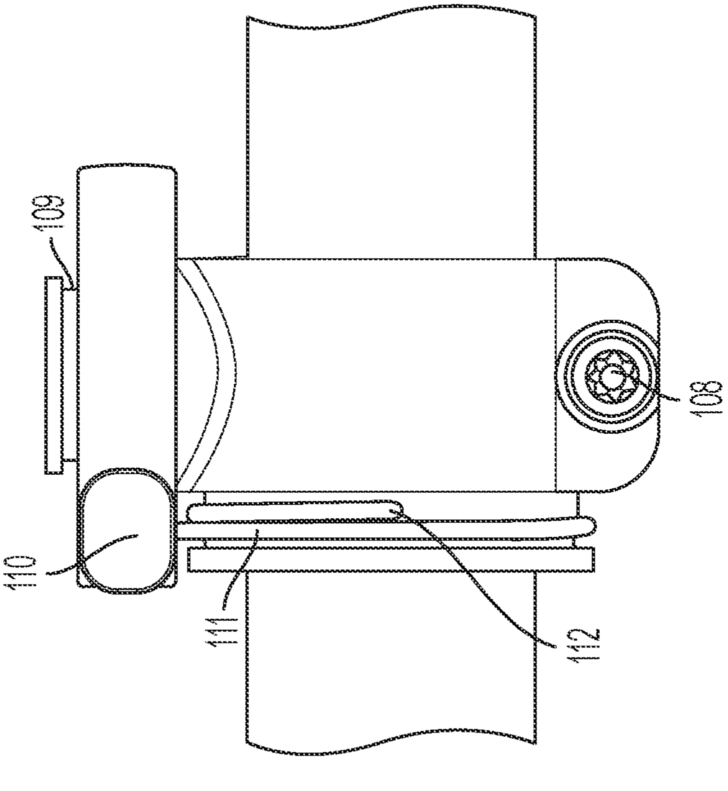
Figure 17:
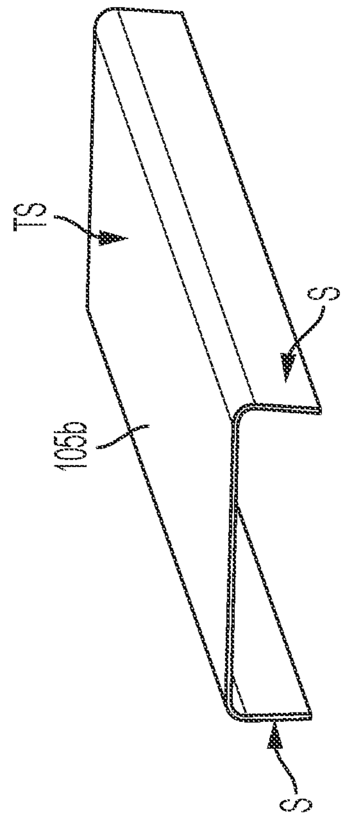
Figure 16:
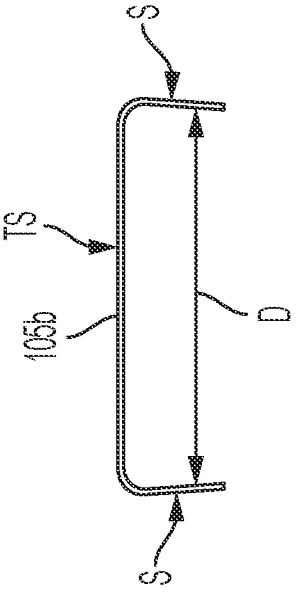
Figure 19:
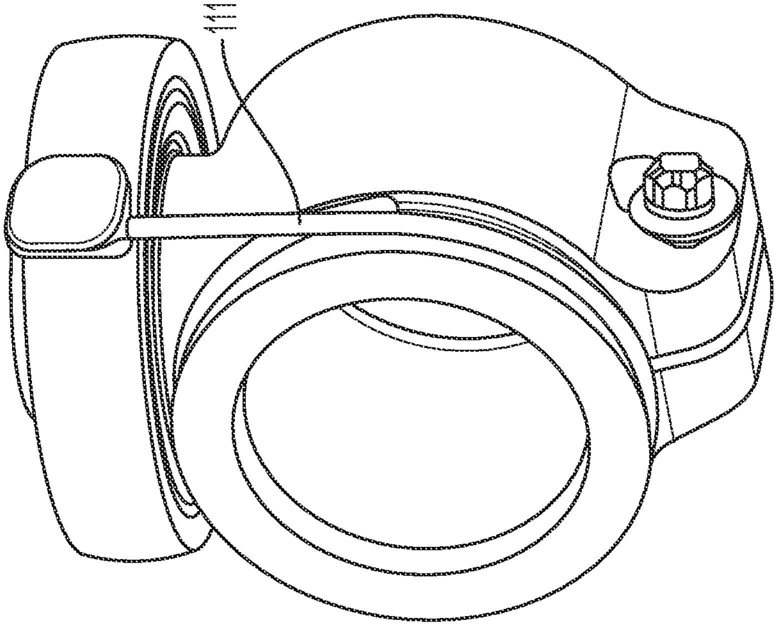
Figure 18:
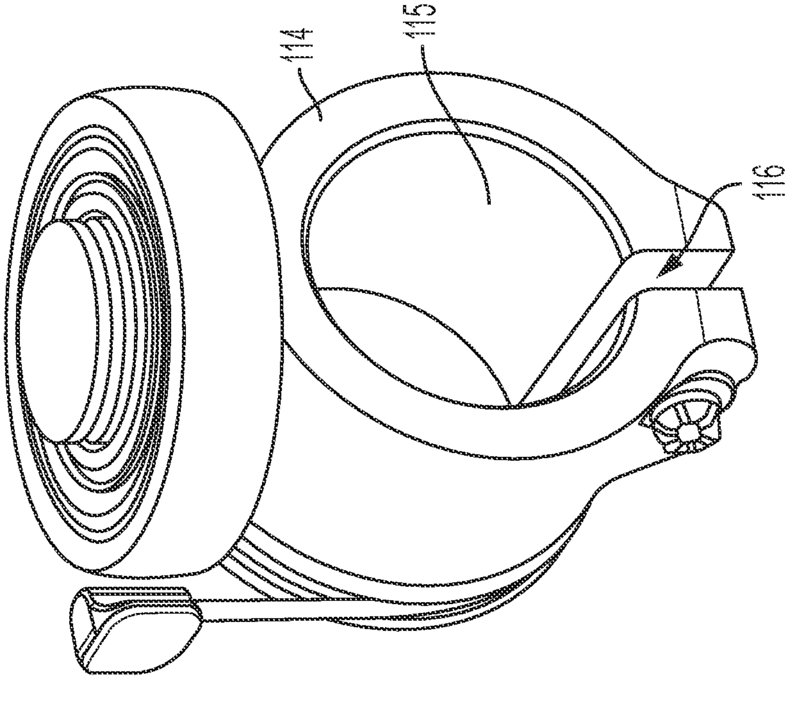
Figure 20:
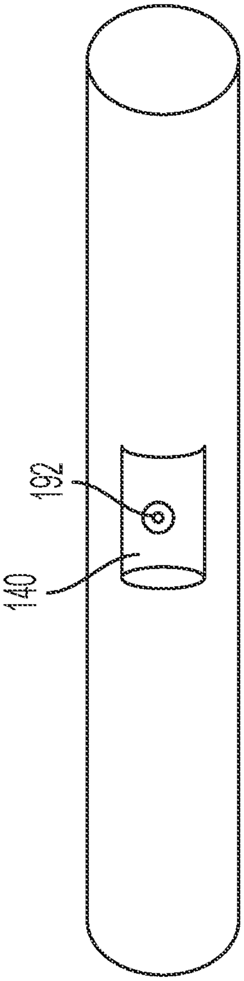
Figure 21:
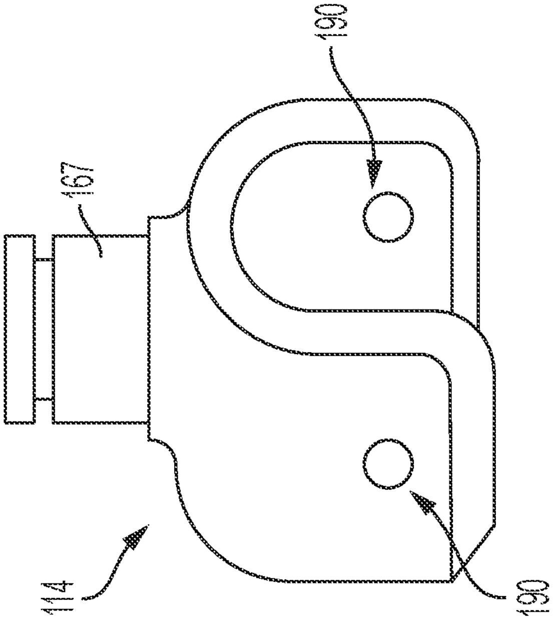
Figure 22:
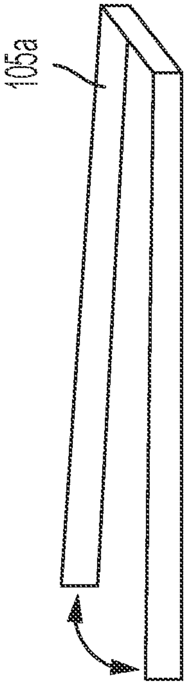
Figure 24:
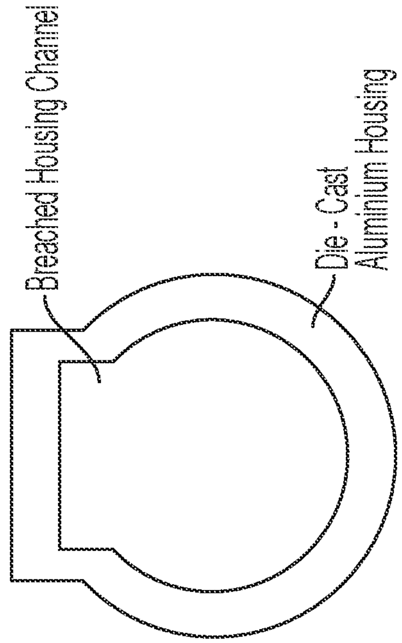
FIGS. 23-27 illustrate the anti-rotation mechanism according to another embodiment.
Figure 23:
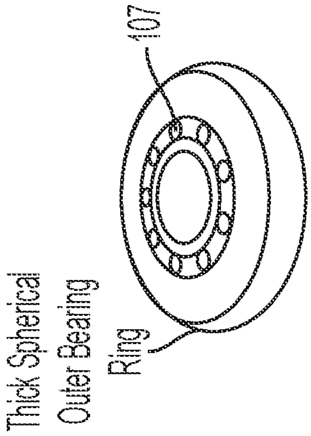
Figure 25:
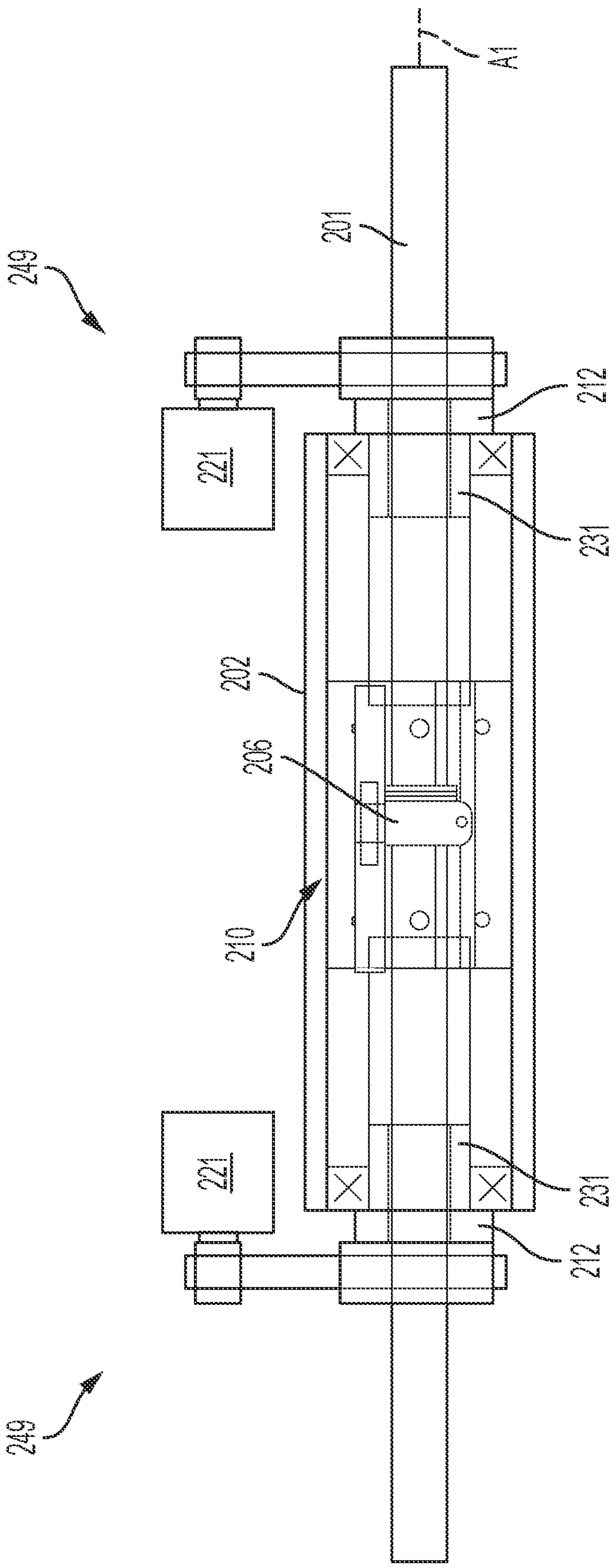
Figure 26:
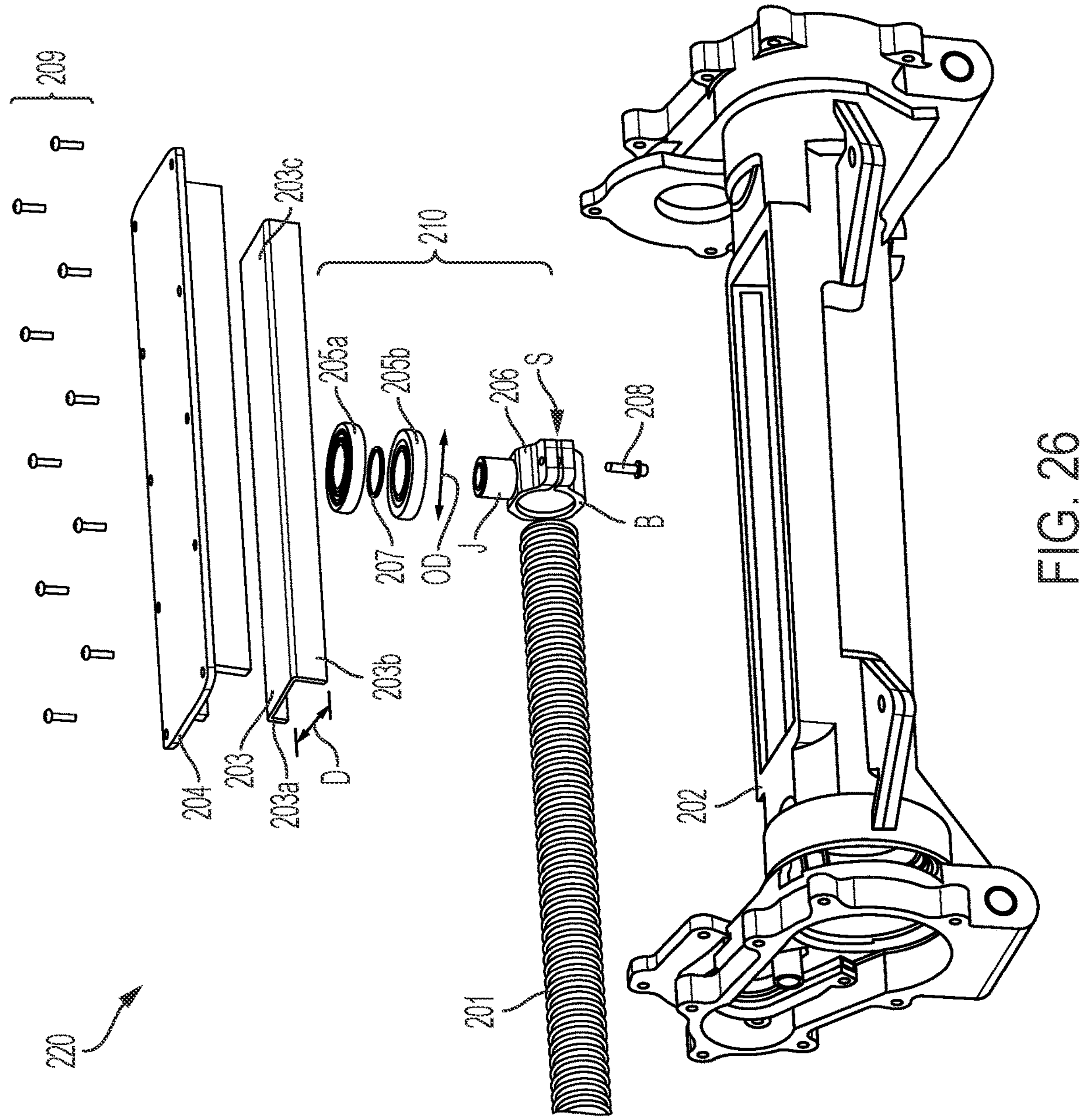
Figure 27:
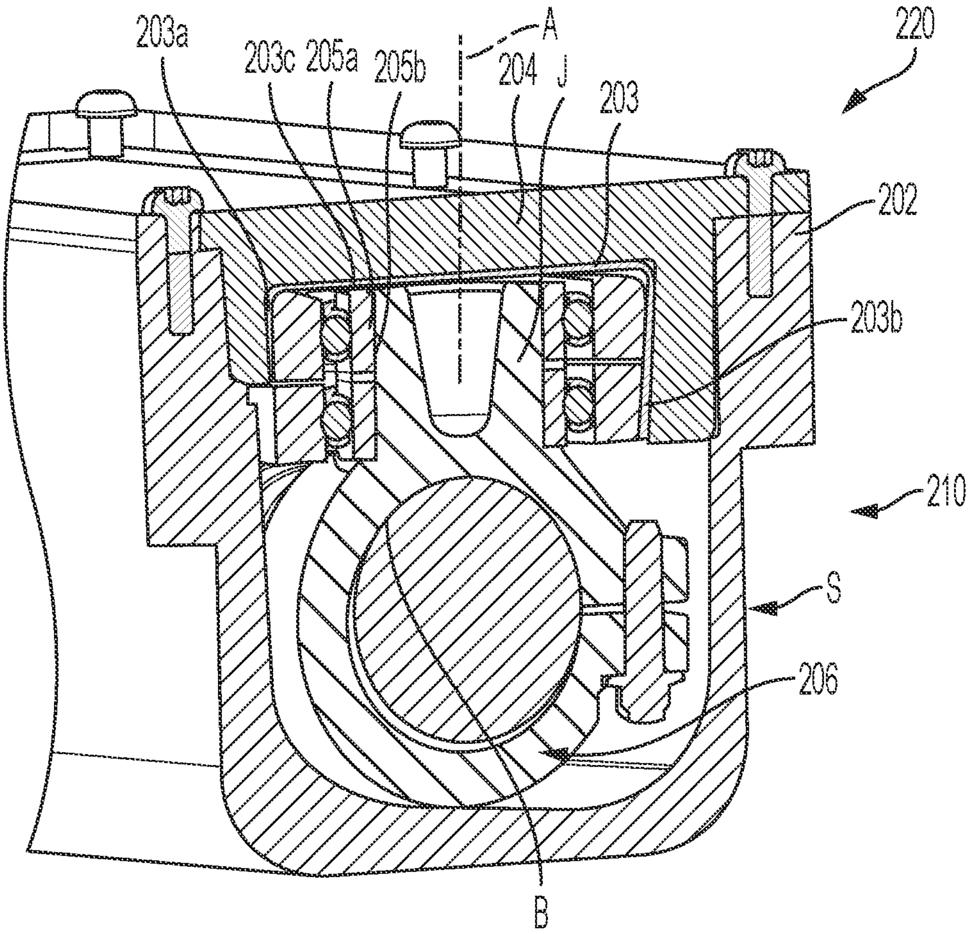

In accordance with another embodiment of the disclosure, rather than the running surface 105*a* being formed as shown in FIGS. 11-13, a running surface 105*b* can be provided as shown in FIGS. 16A and 16B, wherein the running surface 105*b* can be fabricated of the same materials and function similarly to that discussed above for running surface 105*a*.

The running surface **105*b* is shown as having a generally planar top surface TS with opposite sides S extending in generally parallel relation with one another therefrom. The opposite sides S extend generally transversely from the top surface TS. The running surface 105*b* can be configured to fit in an undersized housing groove, by way of example and without limitation, which provides a preload on the sides S of the running surface 105*b* and a preload force on the top surface TS of the running surface 105*b*, thereby effectively de-lashing the running surface 105*b*** in the housing groove from radial and vertical lash.

The embodiments disclosed herein provide several structural features and benefits, including, but not limited to: 1) a yoke and bearing mechanism that clamps onto the surface of the ball screw via a pinch bolt; 2) torque applied to the ball screw by the ball nuts is transferred to the yoke via friction; 3) reaction force is generated at the outer surface of the bearing against the running surface that reacts the ball screw torque; 4) biasing member with a plastic slider forces the bearing to run against one side of the running surface when the ball screw torque is low and prevents reversal noise; 5) the vertical walls of the running surface allow the ball screw to move along the axis of the bearing with no resistance; 6) the spherical profile of the bearing outer ring running on the flat running surfaces allows the ball screw to move side-to-side without generating a side load on the ball screw; 7) mechanism prevents the over constraint of the ball screw axis; 8) mechanism can help support loads from the ball screw during certain bending conditions; and 9) alternative running surface design **105*b*** self de-lashes between itself and the mating groove geometry.

Referring now to FIGS. 23-27, the anti-rotation mechanism 210 is shown according to another embodiment. The anti-rotation mechanism 210 that does not cause an over constraint condition on the rack 201 can be placed at either the end of the ballscrew 201, or in a central region of the housing 202, as desired. A running surface 203 made of a bearing grade material, such as steel, by way of example and without limitation, is positioned in a side cover 204 or housing 202 such that the mechanism's first and second bearings **205*a*, 205*b* will react against it. The bearings 205*a*, 205*b* are pressed onto a journal J on a yoke 206 with a retention method (retaining ring, staking, interference fit, etc.), wherein a spacer 207 can be disposed between the bearings 205*a*, 205*b*. Accordingly, the first bearing 205*a* and the second bearing 205*b*** rotate about a common axis A of rotation.

The bearings **205*a*, 205*b* and spacer 207 could be integrated into a single piece, if desired. The yoke 206 has a through bore B bounded by an inner clamp surface S and the rack 201 extends through the through bore B with the inner clamp surface S being brought into clamped, fixed engagement with the rack 201 to prevent relative movement between the yoke 206 and the rack 201. The yoke 206 is centrally located, by way of example and without limitation, on the rack 201 with a pinch bolt 208 providing a sufficient clamp force to prevent relative movement between the yoke 206 and the rack 201. The through bore B can be textured, e.g. knurled, to increase friction between the rack 201 and the yoke 206. The distance D between the opposite sides 203*a*, 203*b* of the running surface 203 is slightly larger than an OD of outer races, also referred to as outer rings, of the first and second bearings 205*a*, 205*b*, wherein the opposite sides 203*a*, 203*b* can be inclined, also referred to as tapered, such that the opposite sides 203*a*, 203*b* are not parallel with one another, such that each bearing 205*a*, 205*b* will only contact one side, with bearing 205*a* contacting side 203*a*, and bearing 205*b* contacting side 203*b*, and thus, each bearing 205*a*, 205*b* is able to roll against the respective side 203*a*, 203*b*, respectively, of running 203 surface, without contacting the opposite side 203*b*, 203*a***.

The outer ring of the bearings **205*a*, 205*b* can be provided having a profile (spherical, curved, arched, etc.) controlling the point of contact on the running surface 203. The assembly forces the running surface 203 to act as a spring and preloads the rack anti-rotation mechanism 210 to minimize any NVH concerns. As noted, the yoke bore B could be smooth or textured, for example with a knurl, to increase the friction at the interface with the ball screw 201. A split S in the yoke 206 allows for generation of enough deflection to clamp on the ball screw 201 outer surface. This arrangement allows for a reaction force between the first and second bearings 205*a*, 205*b* and the running surface 203 to counteract any torque applied to the ball screw 201 by the ball nuts 212 while minimizing constraining the position of the ball screw 201. The running surface 203 would fit in an undersized groove in a side cover 204 which would provide a preload the sides 203*a*, 203*b* of the running surface 203 and force a preload the top surface 203*c* of the running surface 203, effectively de-lashing the running surfaces 203 in a housing groove from radial and vertical lash. The side cover 204 would be retained to the housing 202 by screws 209 and would incorporate some sort of sealing joint (RTV, PIP Seal, etc.). If additional compliance is required, a pocket could be created between the running surface 203 and cover 204** to allow additional movement, or an additional spring element could be added in this pocket area to fine tune the intended system compliance.

Figure 28:
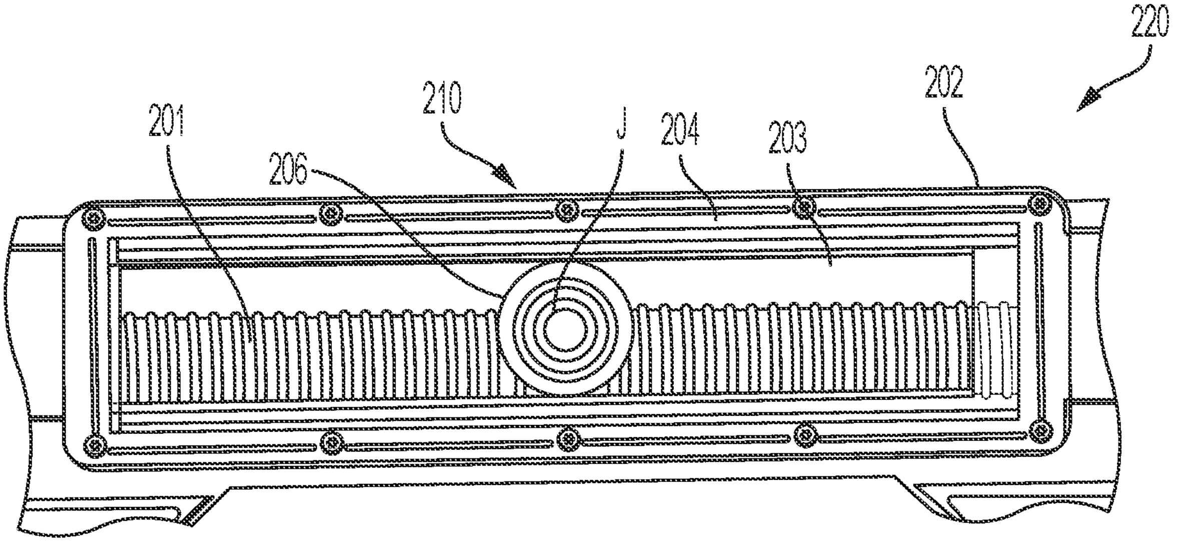
FIGS. 28-33 illustrate the anti-rotation mechanism according to yet another embodiment.
Figure 29:
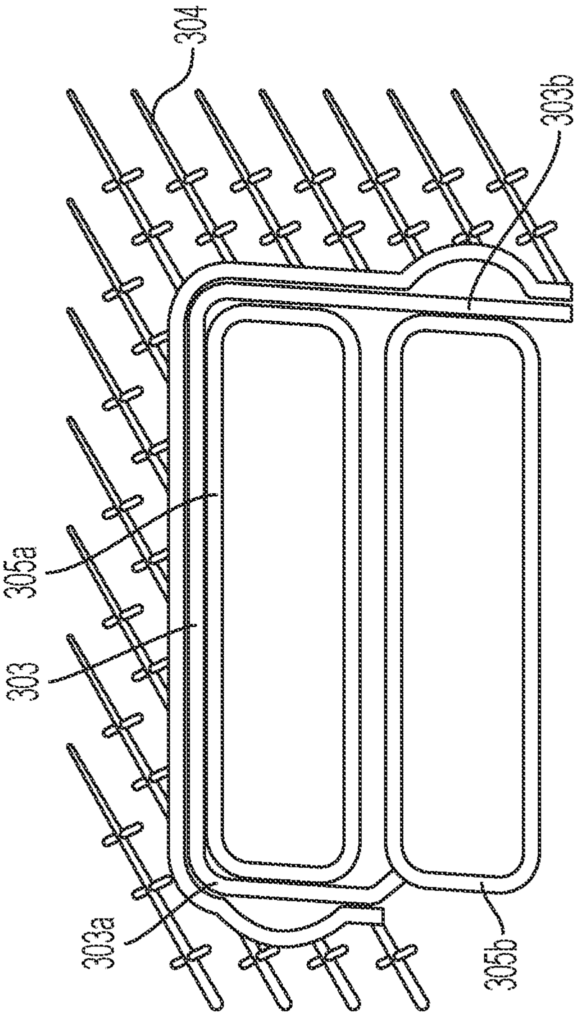

Referring now to FIGS. 28-33, the anti-rotation mechanism 310 is shown according to another embodiment. Referring to FIGS. 28 and 29, the anti-rotation mechanism 311 that does not cause an over constraint condition on the ballscrew 307 can be placed at either the end of the ballscrew 307, or in a central region of the housing 313, as desired. A running plate 301 made of a bearing grade material, such as steel, by way of example and without limitation, is positioned in a side cover 302 or housing 313 such that the mechanism's first and second bearings **305*a*, 305*b* will react against it. The bearings 305*a*, 305*b* are pressed onto a journal on a yoke 304 with a retention method (retaining ring, staking, interference fit, etc.), wherein a spacer 306 can be disposed between the bearings 305*a*, 305*b*. Accordingly, the first bearing 305*a* and the second bearing 305*b* rotate about a common axis of rotation. The bearings 305*a*, 305*b* and spacer 306 could be integrated into a single piece, if desired. The yoke 304 has a through bore bounded by an inner clamp surface and the ballscrew 307 extends through the through bore with the inner clamp surface being brought into clamped, fixed engagement with the ballscrew 307 to prevent relative movement between the yoke 304 and the ballscrew 307. The yoke 304 is centrally located, by way of example and without limitation, on the ballscrew 307 with a pinch bolt 308 providing a sufficient clamp force to prevent relative movement between the yoke 304 and the ballscrew 307. The through bore can be textured, e.g. knurled, to increase friction between the ballscrew 307 and the yoke 304**.

Figure 30:
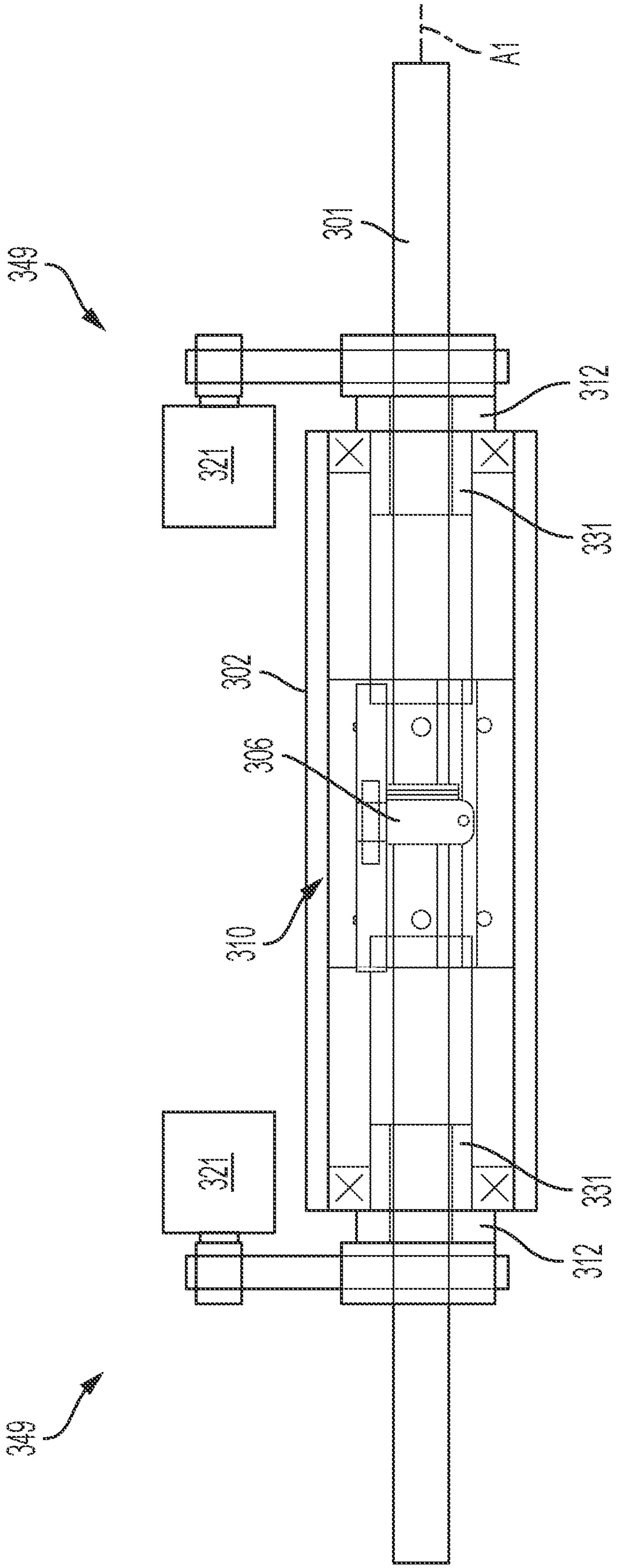
Figure 31:
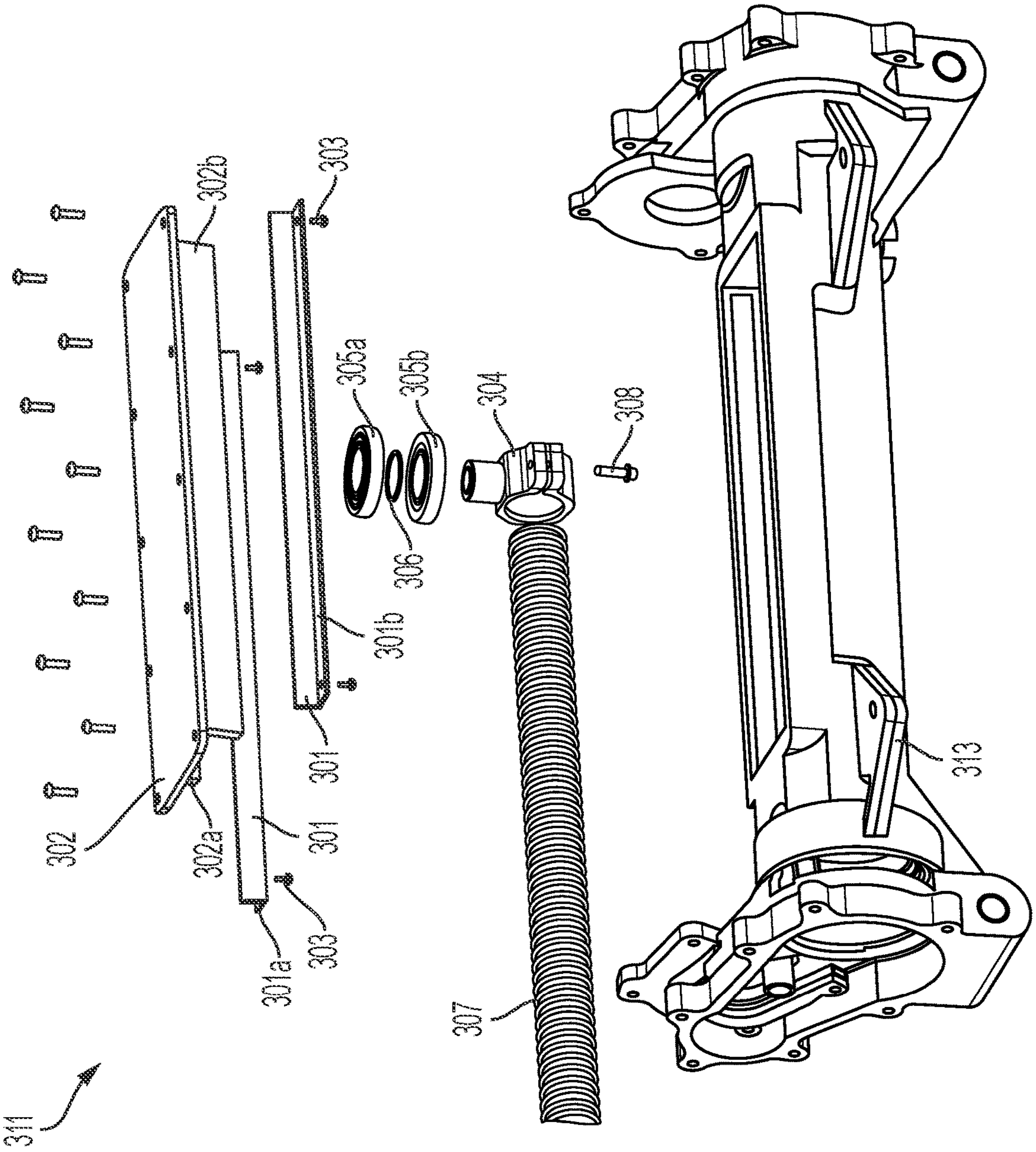
Figure 32:
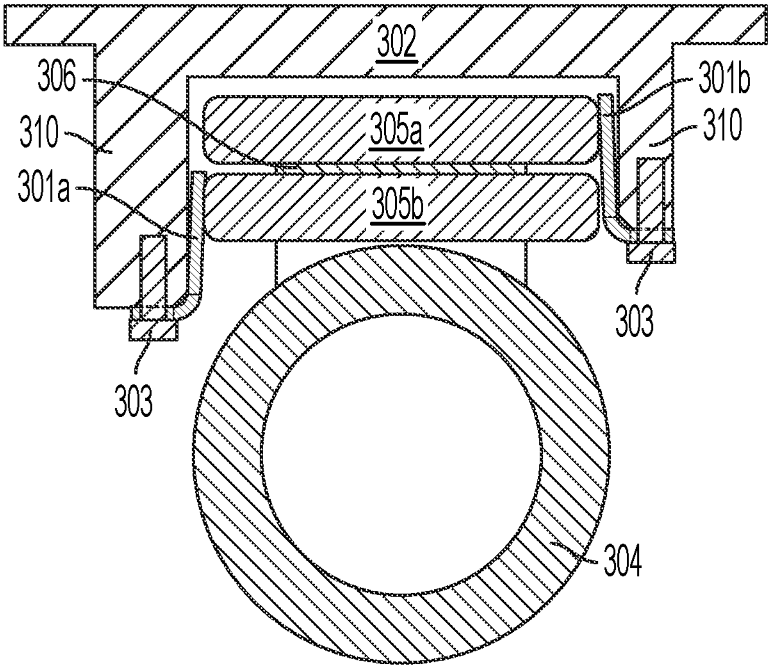
Figure 33:
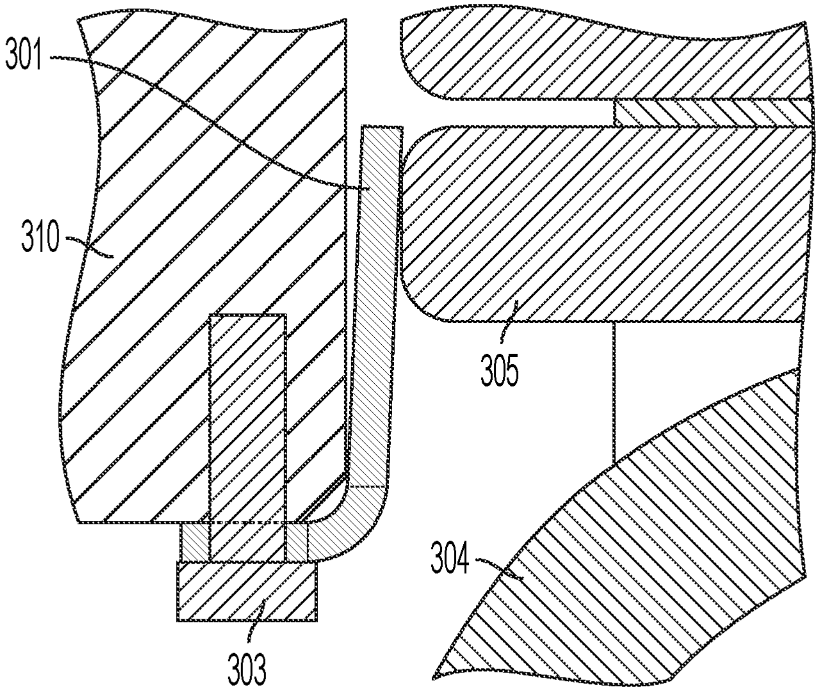

Referring to FIGS. 30 and 31, the running plate 301 may be segmented into a pair of steel wear plates **301*a*, 301*b* that are fastened to the aluminum cover 302 by threaded fasteners 303. The steel wear plates 301*a*, 301*b* may be coupled to a pair of extensions, or legs 302*a*, 302*b* of the side cover 302, where each of the pair of extensions 302*a*, 302*b*** includes a different length to dispose the steel wear plates 301*a*, 301*b* at different positions. Specifically, the steel wear plates 301*a*, 301*b* may be disposed at separate heights where one of the plates 301*a* contacts one of the bearings 305*a*, and the other of the plates 301*b* contacts the other of the bearings 305*b*, applying a force, or pre-load, against the bearings 305*a*, 305*b* in opposing directions. The wear plates 301*a*, 301*b* may be substantially L-shaped, and extend obliquely to the pair of extensions 302*a*, 302*b* to contact the bearings 305. For example, the distance D between the opposite sides 301*a*, 301*b* of the running plates 301 is slightly larger than an OD of outer races, also referred to as outer rings, of the first and second bearings 305*a*, 305*b*, wherein the opposite sides 301*a*, 301*b* can be inclined, also referred to as tapered, such that the opposite sides 301*a*, 301*b* are not parallel with one another, such that each bearing 305*a*, 305*b* will only contact one side, with bearing 305*a* contacting side 301*a*, and bearing 305*b* contacting side 301*b*, and thus, each bearing 305*a*, 305*b* is able to roll against the respective side 301*a*, 301*b*, respectively, of running plate 301, without contacting the opposite side 301*b*, 301*a*.

The outer ring of the bearings 305*a*, 305*b* can be provided having a profile (spherical, curved, arched, etc.) controlling the point of contact on the running plates 301. The assembly forces the running plates 301 to act as a spring and preloads the rack anti-rotation mechanism 311 to minimize any NVH concerns. As noted, the yoke bore could be smooth or textured, for example with a knurl, to increase the friction at the interface with the ballscrew 307. A split in the yoke 304 allows for generation of enough deflection to clamp on the ballscrew 307 outer surface. This arrangement allows for a reaction force between the first and second bearings 305*a*, 305*b* and the running plate 301 to counteract any torque applied to the ballscrew 307 by the ball nuts 312 while minimizing constraining the position of the ballscrew 307.

The running plate 301 would fit in an undersized groove in a side cover 302 which would provide a preload the wear plates 301*a*, 301*b* of the running plates 301 and force a preload the top surface of the running plate 301, effectively de-lashing the running plate 301 in a housing groove from radial and vertical lash. The side cover 302 would be retained to the housing 313 by screws and would incorporate some sort of sealing joint (RTV, PIP Seal, etc.). If additional compliance is required, a pocket could be created between the running plate 303 and cover 302 to allow additional movement, or an additional spring element could be added in this pocket area to fine tune the intended system compliance.

Figure 34:
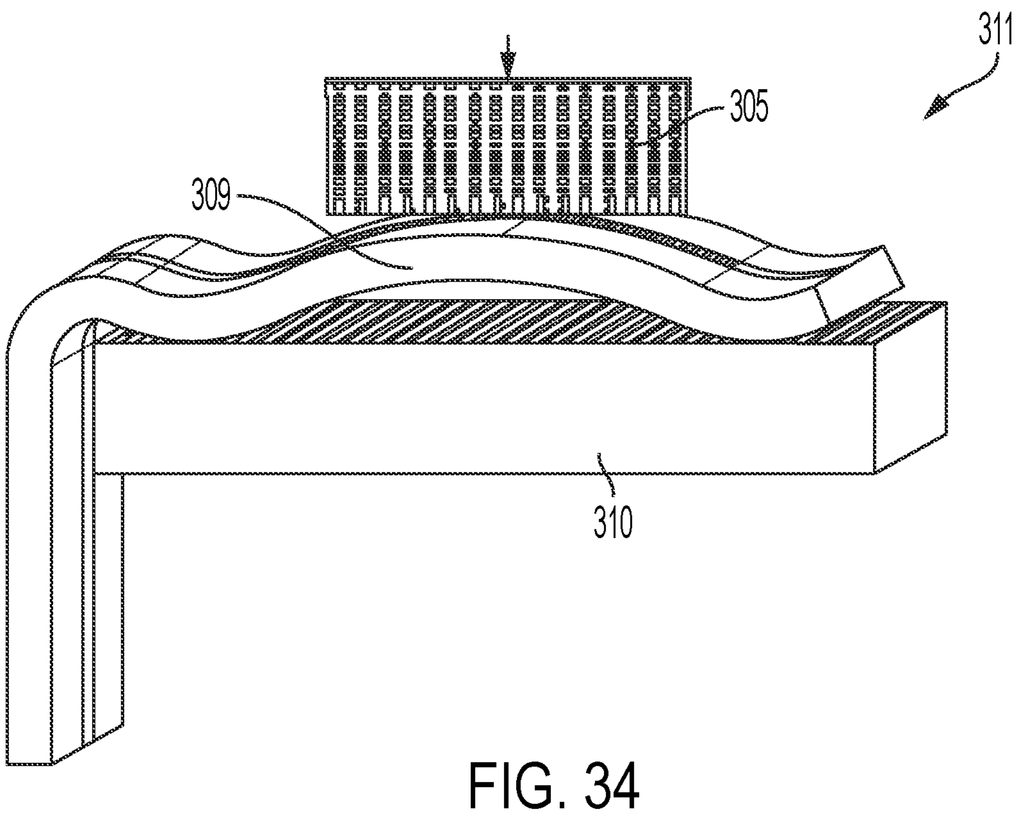
FIG. 34 is a perspective view of a W-shaped wear plate.
Figure 35:
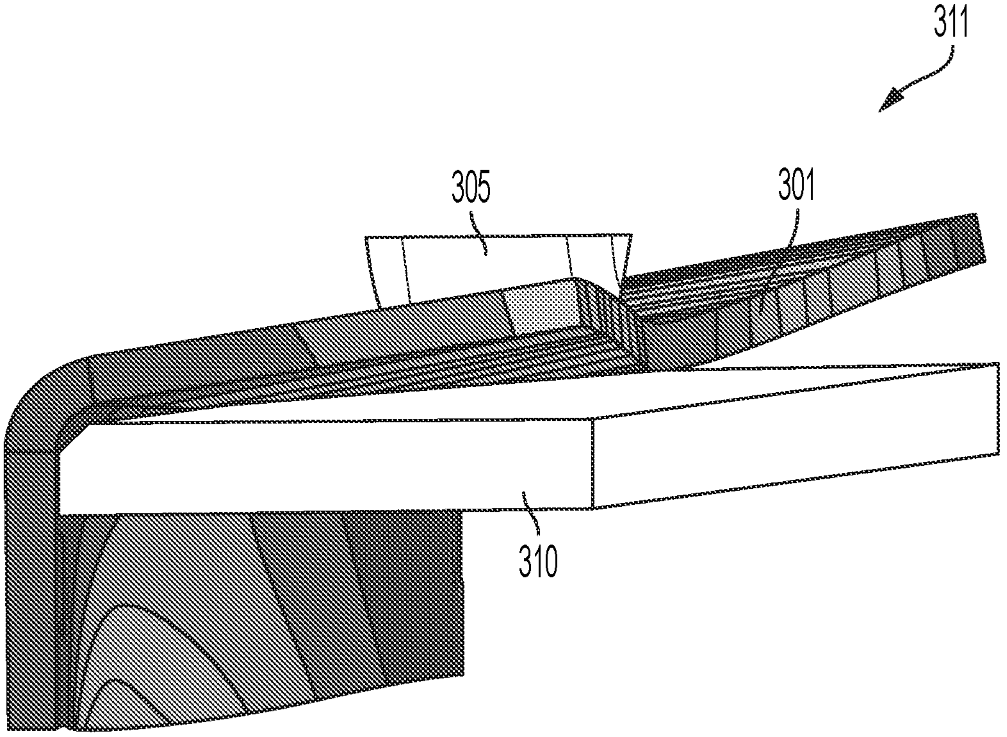
FIG. 35 is a perspective view of an L-shaped wear plate.

Referring to FIG. 34, another embodiment of the running plate 301 is depicted. The alternative running plate 301 includes wear plates 301*a*, 301*b* that are W-shaped, where a central arch 309 of the wear plates 301*a*, 303*b* contacts the bearings 305, and knees 309*a* on opposing sides of the central arch 309 braces against the legs 310 of the side cover 302. The two contact points of the W-shaped running plate 301 realized through the knees 309*a* of the wear plates 301 prevent deflection of the running plate 301 through contact with the bearings 305. Alternatively, as shown in FIG. 35, the embodiment of the L-shaped running plate 301 may be worn through contact with the bearings 305 to deflect toward the legs 310 of the side cover 302.

The embodiments disclosed herein provide several structural features and benefits, including, but not limited to: two steel wear plates 301 fastened to an aluminum cover 302 with a plurality of threaded fasteners 303; a yoke 304 holds two bearings 305 spread apart with a spacer 306; the yoke 304 clamping on to the ball screw 307 via a pinch bolt 308; the bearings 305 being of a standard deep groove Conrad style ball bearing with cylindrical outer surfaces; several potential shapes of the wear plates 301 are contemplated; an L-shaped wear plate 301 is the preferred embodiment due to the resulting spring rate and required material thickness; a W-shaped wear plate 309 is also proposed for cases where a higher spring rate is desired; both embodiments are arranged such that when the unit is assembled the wear plates will be deflected and provide preload against the bearings 305; for both designs, the legs 310 of the cover that support the wear plates can be parallel, which minimizes the manufacturing cost of the cover 302; the cover 302 and the wear plates are designed such that when one wear plate is compressed flat against the cover the other will still have preload on the opposite bearing; this design consideration is critical for quiet operation of the steering mechanism; the initial deflection of the wear plates is designed to achieve a targeted preload and effective spring rate; the exact size and thickness of the wear plates and number of fasteners can be changed to suit the required preload and spring rate of a given application.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steer-by-wire steering system for a vehicle comprising:

a rack moveable in an axial direction; and an anti-rotation device disposed proximate an outer surface of the rack, the anti-rotation device comprising;

a yoke having a bearing journal extending therefrom, the yoke having a through bore bounded by an inner clamp surface and the rack extends through the through bore with the inner clamp surface being brought into clamped, fixed engagement with the rack to prevent relative movement between the yoke and the rack, wherein the yoke includes a split to allow for enough deflection to clamp the yoke on the outer surface of the rack, and wherein the yoke is located on the rack with a pinch bolt providing clamp force;

a bearing pressed onto the bearing journal and with a retaining ring positioned next to the bearing in a retaining ring groove;

a running surface disposed within a rack housing and extending in a longitudinal direction of the rack, the running surface having a first inner running plate surface and a second inner running plate surface, wherein the distance between the first inner running plate surface and the second inner running plate surface is slightly larger than an outer diameter of the bearing, such that the bearing will only contact and thus roll against one side of the running surface at a time, wherein the first inner running plate surface and the second inner running plate surface are flat, and wherein an outer ring of the bearing has a spherical profile which results in a point contact on one of the first inner running plate surface and the second inner running plate surface, wherein the bearing is positioned to move along the running surface during operation.

2. The steer-by-wire steering system of claim 1, further including a biasing member contacting the yoke and a slider member to apply a torque on the yoke during operation.

3. A steering system for a vehicle, comprising:

a rack moveable in an axial direction;

an anti-rotation device disposed about an outer surface of the rack, the anti-rotation device comprising;

a yoke having a bearing journal extending therefrom, the yoke having a through bore bounded by an inner clamp surface and the rack extends through the through bore with the inner clamp surface being brought into clamped, fixed engagement with the rack to prevent relative movement between the yoke and the rack, wherein the yoke includes a split to allow for enough deflection to clamp the yoke on the outer surface of the rack, and wherein the yoke is located on the rack with a pinch bolt providing clamp force;

a first bearing pressed onto the bearing journal;

a second bearing pressed onto the bearing journal; and a running surface in a rack housing, the running surface extending in a longitudinal direction of the rack, the running surface having a first side and a second side opposite the first side, wherein the first side and the second side are generally parallel, wherein the first side and the second side are flat, wherein the distance between the first side and the second side is slightly larger than an outer diameter of an outer ring of the first bearing and an outer diameter of an outer ring of the second bearing, wherein the outer ring of the first bearing has a spherical profile in order to make a point contact on the first side and the outer ring of the second bearing has a spherical profile in order to make a point contact on the second side, wherein the first bearing is positioned to contact and move along the first side of the running surface and the second bearing is positioned to contact and move along the second side of the running surface during operation.

4. The steering system of claim 3, wherein the first bearing does not contact the second side of the running surface.

5. The steering system of claim 3, wherein the second bearing does not contact the first side of the running surface.

6. The steering system of claim 3, wherein the first bearing and the second bearing rotate about a common axis of rotation.

7. The steering system of claim 3, wherein the yoke includes a pair of holes which align with holes defined by the rack to allow the pinch bolt to clamp the yoke to the rack.

8. The steering system of claim 7, wherein the through bore is textured to increase friction between the rack and the yoke.

9. The steering system of claim 3, wherein the steering system is a steer-by-wire steering system.

10. A steering system for a vehicle, comprising:

a rack moveable in an axial direction;

an anti-rotation device disposed about an outer surface of the rack, the anti-rotation device comprising;

a yoke having a bearing journal extending therefrom, the yoke having a through bore bounded by an inner clamp surface and the rack extends through the through bore with the inner clamp surface being brought into clamped, fixed engagement with the rack to prevent relative movement between the yoke and the rack, wherein the yoke includes a split to allow for enough deflection to clamp the yoke on the outer surface of the rack, and wherein the yoke is located on the rack with a pinch bolt providing clamp force;

a first bearing pressed onto the bearing journal;

a second bearing pressed onto the bearing journal; and a pair of running plates comprising a first plate and a second plate at least partially disposed within a rack housing, the running plates extending in a longitudinal direction of the rack, the running plates disposed on opposing sides of the first and second bearing, wherein the first plate has a first inner running plate surface and the second plate has a second inner running plate surface, wherein the first inner running plate surface and the second inner running plate surface are flat, wherein the distance between the first inner running plate surface and the second inner running plate surface is slightly larger than an outer diameter of an outer ring of the first bearing and an outer diameter of an outer ring of the second bearing, wherein the outer ring of the first bearing has a spherical profile in order to make a point contact on the first inner running plate surface and the outer ring of the second bearing has a spherical profile in order to make a point contact on the second inner running plate surface, wherein the first bearing is positioned to contact and move along the first plate and the second bearing is positioned to contact and move along the second plate during operation.

11. The steering system of claim 10, wherein the first bearing does not contact the second plate.

12. The steering system of claim 10, wherein the second bearing does not contact the first plate.

13. The steering system of claim 10, wherein the first bearing and the second bearing rotate about a common axis of rotation.

14. The steering system of claim 10, wherein the yoke includes a pair of holes which align with holes defined by the rack to allow the pinch bolt to clamp the yoke to the rack.

15. The steering system of claim 14, wherein the through bore is textured to increase friction between the rack and the yoke.

16. The steering system of claim 10, wherein the steering system is a steer-by-wire steering system.

17. The steering system of claim 10, wherein each plate is W-shaped.

18. The steering system of claim 10, wherein each plate is L-shaped.

* * * * *